United States Patent [19]

Hibino

[11] 4,312,773
[45] Jan. 26, 1982

[54] LIQUID CRYSTAL COMPOSITIONS
[75] Inventor: Shinichi Hibino, Nara, Japan
[73] Assignee: Sharp Kabushiki Kaisha, Osaka, Japan
[21] Appl. No.: 943,671
[22] Filed: Sep. 19, 1978
[30] Foreign Application Priority Data Sep. 29, 1977 [JP]  Japan ................ 52-118291

[51] Int. Cl.³ ............... C09K 3/34; G02F 1/13
[52] U.S. Cl. ............... 252/299.63; 252/408; 350/350 R; 252/299.67; 252/299.6
[58] Field of Search ............... 252/299, 408; 350/350 R

[56] References Cited

U.S. PATENT DOCUMENTS

| | | | |
|---|---|---|---|
| 3,974,087 | 8/1976 | Gray et al. | 252/299 |
| 3,981,817 | 9/1976 | Boller et al. | 252/299 |
| 4,017,416 | 4/1977 | Inukai et al. | 252/299 |
| 4,043,935 | 8/1977 | Kanbe | 252/299 |
| 4,046,708 | 9/1977 | Dubois | 252/299 |
| 4,048,089 | 9/1977 | Arai et al. | 252/299 |
| 4,069,167 | 1/1978 | Inukai et al. | 252/299 |
| 4,096,086 | 6/1978 | Kanbe | 252/299 |
| 4,103,482 | 8/1978 | Maruyama | 252/299 |
| 4,120,567 | 10/1978 | Goodman et al. | 252/299 |
| 4,130,502 | 12/1978 | Eidenschink et al. | 252/299 |
| 4,137,192 | 1/1979 | Matjufuji | 252/299 |
| 4,137,250 | 1/1979 | Reynolds | 252/299 |
| 4,141,853 | 2/1979 | Hidino et al. | 252/299 |
| 4,147,651 | 4/1979 | Oh | 252/299 |
| 4,154,697 | 5/1979 | Eidenschink et al. | 252/299 |
| 4,162,988 | 7/1979 | Maze et al. | 252/299 |

FOREIGN PATENT DOCUMENTS

| | | | |
|---|---|---|---|
| 2502904 | 7/1975 | Fed. Rep. of Germany | 252/299 |
| 2745050 | 4/1978 | Fed. Rep. of Germany | 252/299 |

OTHER PUBLICATIONS

Abstracts of the 6th International Liquid Crystal Conf., I-3 and I-4, Kent, Ohio (Aug. 23-27, 1976).

Primary Examiner—Teddy S. Gron
Attorney, Agent, or Firm—Hubbell, Cohen, Stiefel & Gross

[57] ABSTRACT

A liquid crystal composition comprising at least one of substituted bipheny-type and substituted terphenyl-type liquid crystal substances and at least one of substituted phenyl benzoate-type and substituted phenyl thiobenzoate-type liquid crystal substances, the composition further containing at least one substituted cyclohexyl benzene-type liquid crystal substance when desired. The composition has the characteristics of being wide in mesomorphic range, low in threshold voltage, satisfactory in orientation, quick-responsive, highly reliable and capable of exhibiting fully satisfactory performance when driven by a single compact power cell coupled directly thereto. The composition is useful for field effect mode liquid crystal display devices.

11 Claims, 11 Drawing Figures

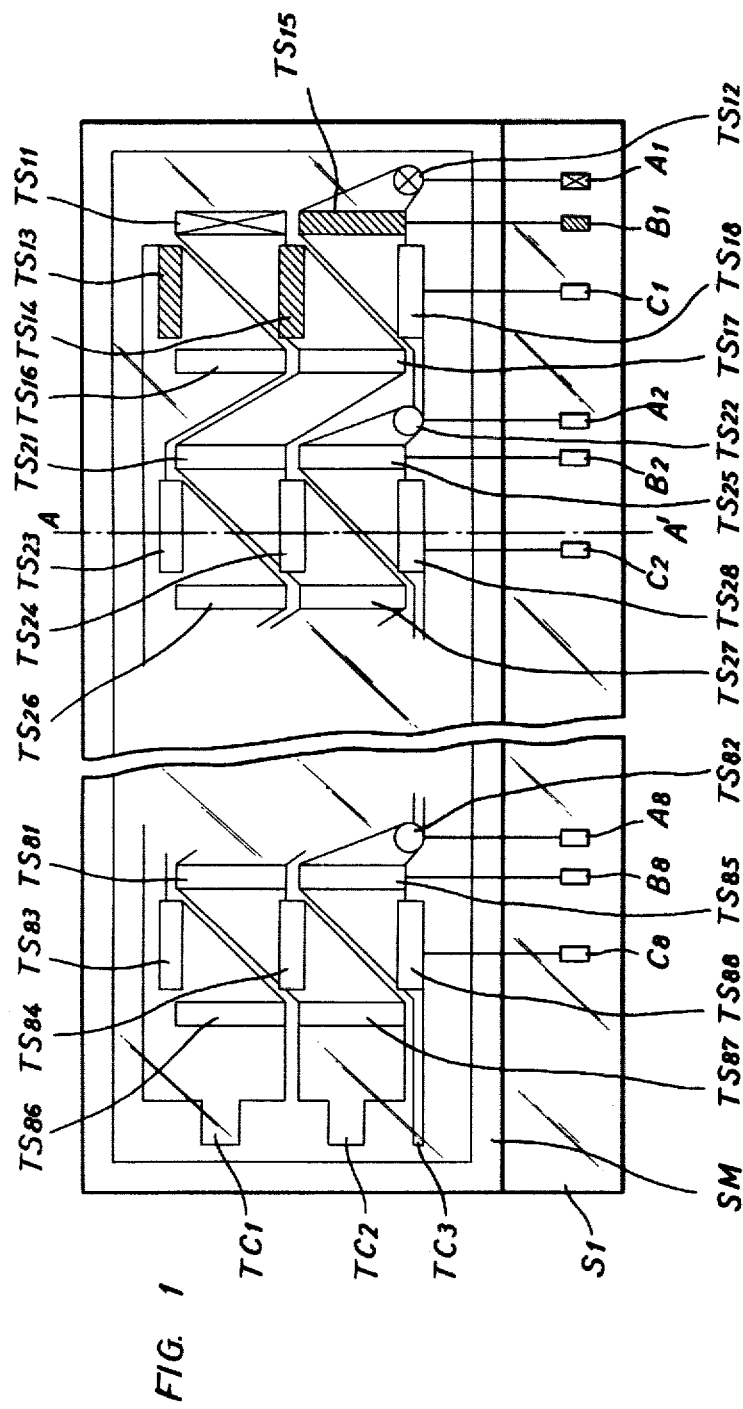
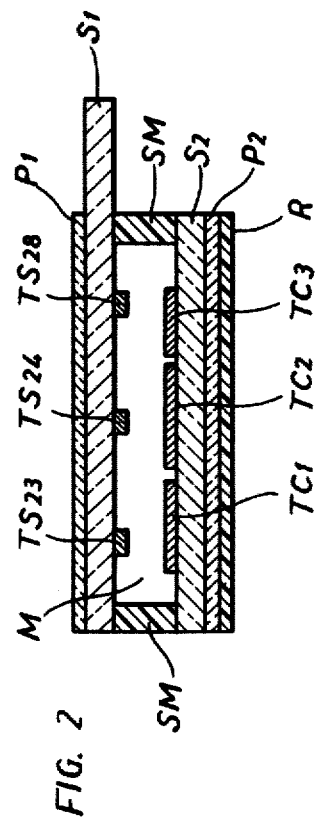
FIG. 1
FIG. 2

| TIME SEGMENT | T1 | T2 | T3 | T4 | T5 | T6 |
|---|---|---|---|---|---|---|
| TS11 | $V_0/3$ | $V_0$ | $V_0/3$ | $V_0/3$ | $V_0$ | $V_0/3$ |
| TS12 | $V_0$ | $V_0/3$ | $V_0/3$ | $V_0$ | $V_0/3$ | $V_0/3$ |
| TS13 | $V_0/3$ | $V_0/3$ | $V_0$ | $V_0/3$ | $V_0/3$ | $V_0$ |
| TS14 | $V_0/3$ | $V_0/3$ | $V_0/3$ | $V_0/3$ | $V_0/3$ | $V_0/3$ |
| TS15 | $V_0$ | $V_0/3$ | $V_0/3$ | $V_0$ | $V_0/3$ | $V_0/3$ |
| TS16 | $V_0/3$ | $V_0/3$ | $V_0$ | $V_0/3$ | $V_0/3$ | $V_0$ |
| TS17 | $V_0/3$ | $V_0$ | $V_0/3$ | $V_0/3$ | $V_0$ | $V_0/3$ |
| TS18 | $V_0$ | $V_0/3$ | $V_0/3$ | $V_0$ | $V_0/3$ | $V_0/3$ |
| TS21 / TS88 | $V_0/3$ | $V_0/3$ | $V_0/3$ | $V_0/3$ | $V_0/3$ | $V_0/3$ |

LIQUID CRYSTAL COMPOSITIONS

BACKGROUND OF THE INVENTION

This invention relates to liquid crystal compositions having positive dielectric anisotropic properties and adapted for use in field effect mode liquid crystal display devices, and more particularly to liquid crystal compositions having a low threshold voltage, a wide mesomorphic range and high reliability.

Field effect mode liquid crystal display devices can be operated at low voltage with reduced power consumption, rendering cells serviceable therefor over a prolonged period of time. Thus they have found increasing use in desk-model electronic calculators, electronic timepieces, measuring instruments and like cell powered electronic devices.

However, display devices have not been provided yet which have satisfactory characteristics and which are adapted to be operated by a single compact silver oxide cell (cell voltage: 1.57 volts) or lithium cell (cell voltage: 2.8 volts) directly coupled thereto.

This invention provides liquid crystal compositions which are very useful for field effect mode liquid crystal display devices to be driven by a single silver oxide or lithium cell and which are prepared by mixing together suitable proportions of various liquid crystal substances each having its merit and demerit.

SUMMARY OF THE INVENTION

The liquid crystal compositions of this invention comprise at least one compound represented by the formula (I)

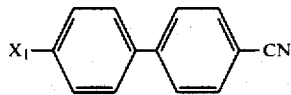
(I)

wherein $X_1$ is n-alkyl having 4 to 8 carbon atoms, n-alkoxy having 4 to 8 carbon atoms or p-n-alkylphenyl containing $C_{4-8}$ n-alkyl, and at least one compound represented by the formula (II):

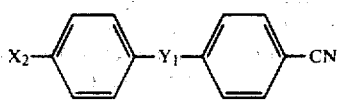
(II)

wherein $X_2$ is n-alkyl having 4 to 8 carbon atoms, n-alkylcarbonyloxy having 5 to 9 carbon atoms or p-n-alkylphenyl containing $C_{4-8}$ n-alkyl, and $Y_1$ is a group represented by —COO— or —COS—, the compositions further comprising at least one compound represented by the formula (III):

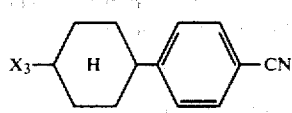
(III)

wherein $X_3$ is n-alkyl having 3 to 8 carbon atoms when so desired.

The liquid crystal compositions of this invention are usable for field effect mode liquid crystal display devices. The present compositions have the characteristics of being wide in mesomorphic range, low in threshold voltage, satisfactory in orientation, quick-responsive, highly reliable and capable of exhibiting fully satisfactory performance when used in display devices of the direct drive type employing a single compact power cell.

BRIEF DESCRIPTION OF THE DRAWINGS

FIG. 1 is a plan view of one form of a twisted-nematic Field Effect mode liquid crystal cell in accordance with the present invention;

FIG. 2 is a sectional view, taken along line A–A' of FIG. 1, of the liquid crystal cell shown in FIG. 1;

DESCRIPTION OF THE PREFERRED EMBODIMENTS

Figure 3:
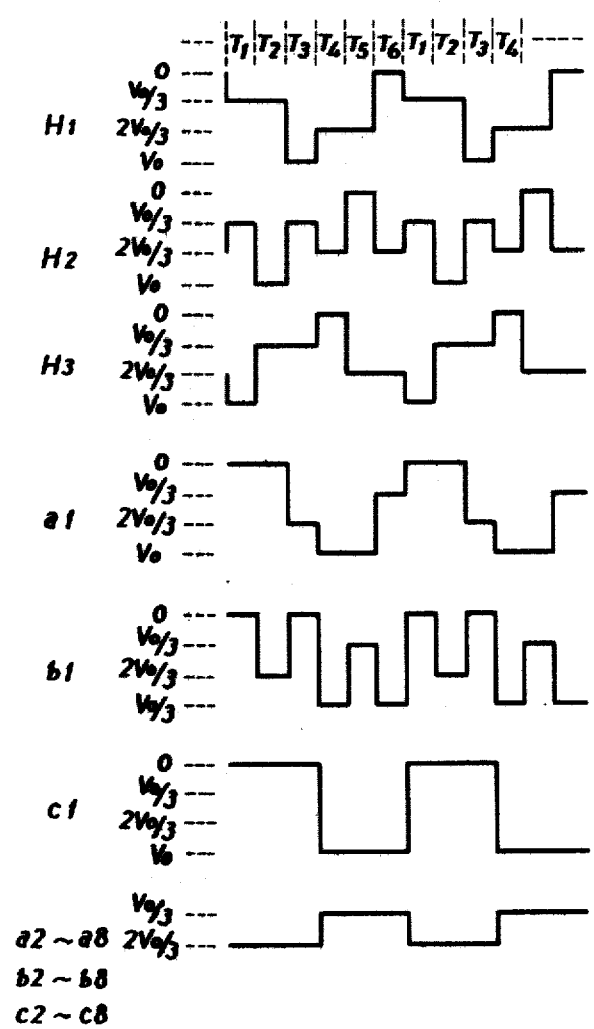
FIG. 3 is a time chart showing the wave forms of voltages applied to a ⅓ bias, ⅓ duty drive system utilized to drive the display cell of FIG. 1.

Typical of the compounds of the formulae (I), (II) and (III) useful in this invention are:

(1) Biphenyl-type liquid crystal substances (compounds of the formula (I))

|  | Mesomorphic range (°C.) |
|---|---|
| 4-n-Pentyl-4'-cyano-biphenyl | 22.5 $\xrightarrow{N}$ 35.2 |
| 4-n-Hexyl-4'-cyano-biphenyl | 14.5 $\xrightarrow{N}$ 29.4 |
| 4-n-Heptyl-4'-cyano-biphenyl | 28.5 $\xrightarrow{N}$ 42.5 |
| 4-n-Octyl-4'-cyano-biphenyl | 21.1 $\xrightarrow{S}$ 33.5 $\xrightarrow{N}$ 41.5 |
| 4-n-Pentoxy-4'-cyano-biphenyl | 53.5 $\xrightarrow{N}$ 67.5 |
| 4-n-Hexoxy-4'-cyano-biphenyl | 57.0 $\xrightarrow{N}$ 75.5 |
| 4-n-Heptoxy-4'-cyano-biphenyl | 54.7 $\xrightarrow{N}$ 74 |
| 4-n-Octoxy-4'-cyano-biphenyl | 55 $\xrightarrow{S}$ 65.6 $\xrightarrow{N}$ 78.4 |
| 4-n-Pentyl-4'-cyano-p-terphenyl | 131 $\xrightarrow{N}$ 238.5 |

(2) Ester-type liquid crystal substances (compounds of the formula (II))

| | Mesomorphic range (°C.) |
|---|---|
| 4'-Cynanophenyl 4-(p-n-pentylphenyl)-benzoate | 110 $\xrightarrow{N}$ 231 |
| 4'-Cynanophenyl 4-(n-butyl)benzoate | 41.5 $\xrightarrow[\text{MON}]{N}$ 66.5 |
| 4'-Cynanophenyl 4-(n-pentyl)benzoate | 56 $\xrightarrow[\text{MON}]{N}$ 60 |
| 4'-Cynanophenyl 4-(n-hexyl)benzoate | 44.5 $\xrightarrow{N}$ 47.5 |
| 4'-Cynanophenyl 4-(n-heptyl)benzoate | 43.5 $\xrightarrow{N}$ 56 |
| 4'-Cynanophenyl 4-(n-pentyl)thiobenzoate | 76 $\xrightarrow{N}$ 98 |
| 4'-Cynanophenyl 4-(n-propylcarbonyloxy)-benzoate | 94.5 $\xrightarrow{N}$ 102.5 |

(3) Cyclohexyl benzene-type liquid crystal substances (compounds of the formula (III))

| | Mesomorphic range (°C.) |
|---|---|
| 4-n-Propylcyclohexyl 4'-cyanobenzene | 42 $\xrightarrow{N}$ 45 |
| 4-n-Pentylcyclohexyl 4'-cyanobenzene | 30 $\xrightarrow{N}$ 55 |
| 4-n-Heptylcyclohexyl 4'-cyanobenzene | 30 $\xrightarrow{N}$ 57 |

Note: S stands for smectic phase, N nematic phase and MON monotripic liquid crystal.

Liquid crystal substances for use in field effect mode display devices, when used singly, do not exhibit satisfactory performance because each has its own merit and demerit. For example, compounds of the Schiff base type are not useful when evaluated mainly for reliability. Azoxy compounds require a yellow filter and have the serious drawback of giving displays of reduced quality. Compositions composed of biphenyl-type compounds alone, although having a relatively low viscosity, have a threshold voltage of 1.1 volts (effective value) at lowest. Compounds of the ester type (including those of the thioester type) are viscous and have a relatively high mesomorphic range despite their low threshold voltage (0.8 volt). Cyclohexyl benzene-type compounds are of low viscosity and as low as about 0.9 volts in threshold voltage but have poor orientation.

We have conducted intensive research and developed useful liquid crystal compositions from the foregoing liquid crystal substances by mixing such substances to compensate for the drawback of each substance while utilizing the advantage thereof.

Examples of preferred liquid crystal compositions are those prepared from at least one compound of the formula (I) and at least one compound of the formula (II). More specific examples are:

(1)

4-n-Pentyl-4'-cyano-biphenyl
4-n-Pentoxy-4'-cyano-biphenyl
4n-Heptyl-4'-cyano-biphenyl
4-n-Pentyl-4'-cyano-p-terphenyl
4'-Cyanophenyl 4-(n-butyl)benzoate
4'-Cyanophenyl 4-(n-pentyl)benzoate
4'-Cyanophenyl 4-(n-pentyl)thiobenzoate (2)

4-n-Pentyl-4'-cyano-biphenyl
4-n-Pentoxy-4'-cyano-biphenyl
4-n-Heptyl-4'-cyano-biphenyl
4'-Cyanophenyl 4-(p-n-pentylphenyl)benzoate
4'-Cyanophenyl 4-(n-butyl)benzoate
4'-Cyanophenyl 4-(n-pentyl)benzoate
4'-Cyanophenyl 4-(n-pentyl)thiobenzoate (3)

4-n-Pentyl-4'-cyano-biphenyl
4-n-Pentoxy-4'-cyano-biphenyl
4-n-Pentyl-4'-cyano-p-terphenyl
4-Heptyl-4'-cyano-biphenyl
4'-Cyanophenyl 4-(n-butyl)benzoate
4'-Cyanophenyl 4-(n-pentyl)benzoate
4'-Cyanophenyl 4-(n-heptyl)benzoate
4'-Cyanophenyl 4-(n-propylcarbonyloxy)benzoate Other examples of preferred liquid crystal compositions are those composed of at least one compound of the formula (I), at least one compound of the formula (II) and at least one compound of the formula (III) and including:

(4)

4-n-Pentyl-4'-cyano-biphenyl
4-n-Pentoxy-4'-cyano-biphenyl
4'-Cyanophenyl 4-(n-pentylphenyl)benzoate
4-n-Pentylcyclohexyl 4'-cyanobenzene
4'-Cyanophenyl 4-(n-butyl)benzoate
4'-Cyanophenyl 4-(n-pentyl)benzoate
4'-Cyanophenyl 4-(n-pentyl)thiobenzoate (5)

4-n-Pentyl-4'-cyano-biphenyl
4-n-Pentoxy-4'-cyano-biphenyl
4'-Cyanophenyl 4-(p-n-pentylphenyl)benzoate
4-n-Propylcyclohexyl 4'-cyanobenzene
4'-Cyanophenyl 4-(n-butyl)benzoate
4'-Cyanophenyl 4-(n-pentyl)benzoate
4'- Cyanophenyl 4-(n-hexyl)benzoate
4'-Cyanophenyl 4-(n-pentyl)thiobenzoate (6)

4-n-Pentyl-4'-cyano-biphenyl
4-n-Pentoxy-4'-cyano-biphenyl
4-n-Pentyl-4'-cyano-p-terphenyl
4'-Cyanophenyl 4-(n-butyl)benzoate
4'-Cyanophenyl 4-(n-pentyl)benzoate
4'-Cyanophenyl 4-(n-heptyl)benzoate
4'-Cyanophenyl 4-(n-propylcarbonyloxy)benzoate
4-n-Pentylcyclohexyl 4'-cyanobenzene (7)

4-n-Pentyl-4'-cyano-biphenyl
4-n-Pentoxy-4'-cyano-biphenyl
4-n-Pentyl-4'-cyano-p-terphenyl
4-n-Heptyl-4'-cyano-biphenyl
4'-Cyanophenyl 4-(n-butyl)benzoate
4'-Cyanophenyl 4-(n-pentyl)benzoate
4'-Cyanophenyl 4-(n-propylcarbonyloxy)benzoate
 4-n-Pentylcyclohexyl 4'-cyanobenzene (8)

4-n-Pentyl-4'-cyano-biphenyl
4-n-Pentoxy-4'-cyano-biphenyl
4-n-Pentyl-4'-cyano-p-terphenyl
4'-Cyanophenyl 4-(n-butyl)benzoate
4'-Cyanophenyl 4-(n-pentyl)benzoate
4'-Cyanophenyl 4-(n-propylcarbonyloxy)benzoate
4-n-Butylcyclohexyl 4'-cyanobenzene
4-n-Pentylcylohexyl 4'-cyanobenzene 4-n-Heptylcyclohexyl 4'-cyanobenzene Various characteristics required of these liquid crystals for use in field effect mode liquid crystal display devices will be described below along with the drive systems employed therefor.

(1) Mesomorphic range

Since the liquid crystal compositions as incorporated in display devices are used at temperatures of about 0° C. to 40° C., they must have a mesomorphic range wider than the range of −10° C. to 50° C.

(2) Threshold voltage

With a drive system of the direct power cell-coupled type in which the actuating voltage is equal to the cell voltage, the threshold voltage $V_{th}$ of the liquid crystal composition must be approximate to the voltage $V_o$ of the cell serving as the power supply and to the bias voltage $V_{bias}$ which is dependent on the drive system. If the threshold voltage is too high relative to the bias voltage, the display will involve poor contrast, whereas if it is too low, non-selected segments will loom up, giving a display of poor quality.

Table 1 below shows bias voltages $V_{bias}$ and actuating voltages $V_{on}$ for various drive systems.

TABLE 1

| Drive system | | Mercury oxide cell (1.35 V)* | | Silver oxide cell (1.57 V)* | | (in volt) Lithium cell (2.8 V)* | |
|---|---|---|---|---|---|---|---|
| Bias | Duty | $V_{bias}$ | $V_{on}$ | $V_{bias}$ | $V_{on}$ | $V_{bias}$ | $V_{on}$ |
| ½ | ½ | 0.47 | 1.07 | 0.55 | 1.24 | 0.98 | 2.21 |
| ⅓ | ⅓ | 0.55 | 0.95 | 0.64 | 1.11 | 1.14 | 1.98 |
| ½ | ⅓ | 0.45 | 1.01 | 0.52 | 1.17 | 0.93 | 2.08 |
| ⅓ | ¼ | 0.45 | 0.86 | 0.52 | 0.99 | 0.93 | 1.78 |

*Cell voltage

The voltage $V_{on}$ is the effective value of the voltage on the liquid crystal composition of the selected segments, and the voltage $V_{bias}$ is that of the voltage on the liquid crystal composition of the non-selected segments.

The voltages $V_{on}$ and $V_{bias}$ involved in the drive systems are expressed by the following equations.

½ Bias 1/N duty drive system:

$$V_{on} = \sqrt{\frac{N+3}{N}} \times \frac{V_o}{2}$$

$$V_{bias} = \sqrt{\frac{N-1}{N}} \times \frac{V_o}{2}$$

⅓ Bias 1/N duty drive system:

$$V_{on} = \sqrt{\frac{N+8}{N}} \times \frac{V_o}{3}$$

$$V_{bias} = \frac{V_o}{3}$$

Description of the drive systems

* 1/M Bias ⅓ duty drive system

The construction of the twisted nematic field effect mode liquid crystal cell (hereinafter referred to as "TNFEM liquid crystal cell") for which this drive system is employed will be described with reference to FIGS. 1 and 2. FIG. 1 is a plan view, and FIG. 2 is a view in section taken along the line A—A' in FIG. 1.

These drawings show glass base plates $S_1$, $S_2$; transparent segmental electrodes $TS_{11}$ to $TS_{18}$, $TS_{21}$ to $TS_{28}$, ..., $TS_{81}$ to $TS_{88}$ formed on the glass base plate $S_1$; transparent common electrodes $TC_1$, $TC_2$, $TC_3$ formed on the glass base plate $S_2$; and terminals $A_1$, $B_1$, $C_1$, $A_2$, ..., $B_8$, $C_8$ led out from the transparent segmental electrodes. The transparent segmental electrodes $TS_{i1}$ and $TS_{i2}$ are connected to the terminal $A_i$; $TS_{i3}$, $TS_{i4}$, $TS_{i5}$ to the terminal $B_i$; and $TS_{i6}$, $TS_{i7}$, $TS_{i8}$ to the terminal $C_i$ wherein $i=1, ..., 8$. Indicated at SM is a sealing member. The glass base plates $S_1$ and $S_2$ bearing the transprent electrodes are surface-treated and thereafter subjected to rubbing treatment. The rubbing directions are at right angles. The drawings further show polarizing plates $P_1$, $P_2$ with the directions of polarization at right angles, a reflecting plate R and a liquid crystal composition M. The cell is 7.5 μm in thickness.

(a) ⅓ Bias ⅓ duty drive system.

Figures 4, 5:
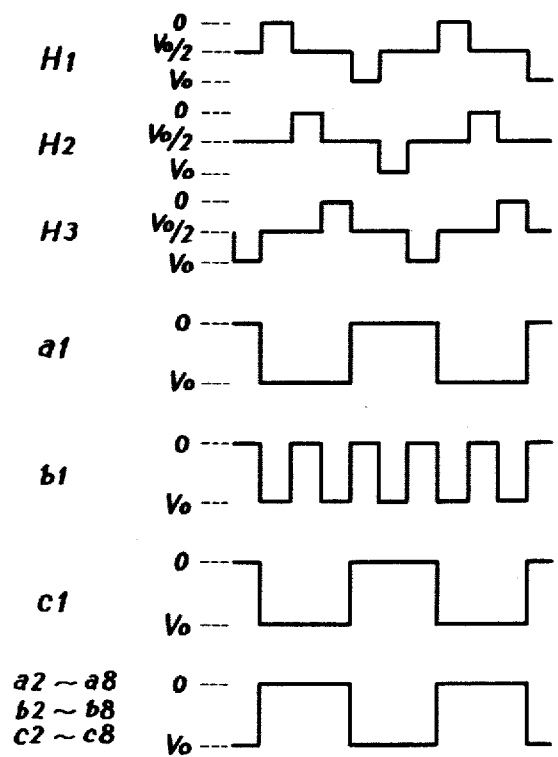
FIG. 4 is a chart showing variations in the voltage to be impressed on the liquid crystal composition of the transparent segmental electrodes.
FIG. 5 is a time chart showing the wave forms of voltages applied to a ½ bias, ⅓ duty drive system utilized to drive the display cell of FIG. 1.

FIG. 3 is a time chart showing the wave forms involved in this drive system, namely of the transparent common electrode selection signals $H_1$, $H_2$, $H_3$ to be applied to the common electrodes $TC_1$, $TC_2$, $TC_3$ respectively, and transparent segmental electrode selection signals $a_1$, $b_1$, $c_1$, $a_2$, ..., $c_8$ to be applied to the terminals $A_1$, $B_1$, $C_1$, $A_2$, ..., $B_8$, $C_8$ respectively when ⊡ is to be displayed at the lowermost place. The cycle of the signals is 5 m. sec. FIG. 4 shows variations in the voltage to be impressed on the liquid crystal composition of the segments. With this ⅓ bias ⅓ duty drive system, the effective value $V_{on}$ of the voltage to be applied to the liquid crystal composition of the selected segments $TS_{11}$, $TS_{12}$, $TS_{13}$, $TS_{15}$, $TS_{16}$, $TS_{17}$, $TS_{18}$ is given by:

$$V_{on} = \sqrt{\frac{(V_o/3)^2 \times 2 + V_o^2}{3}} = \sqrt{\frac{11}{3}} \times \frac{V_o}{3}$$

The effective value $V_{bias}$ of the voltage on the liquid crystal composition of the non-selected segments $TS_{14}$, $TS_{21}$, ..., $TS_{88}$ is given by:

$$V_{bias} = (V_o/3)$$

(b) ½ Bias ⅓ duty drive system

FIG. 5 is a time chart showing the wave forms involved in this drive system, namely of the transparent common electrode selection signals $H_1$, $H_2$, $H_3$ to be applied to the common electrodes $TC_1$, $TC_2$, $TC_3$ respectively, and transparent segmental electrode selection signals $a_1$, $b_1$, $c_1$, $a_2$, ..., $c_8$ to be applied to the terminals $A_1$, $B_1$, $C_1$, $A_2$, ..., $B_8$, $C_8$ respectively when ⊡ is to be displayed at the lowermost place. With this ½ bias ⅓ duty drive system, the effective value $V_{on}$ of the voltage to be applied to the liquid crystal composition of the selected segments is given by:

$$V_{on} = \sqrt{\frac{(V_o/2)^2 \times 2 + V_o^2}{3}} = \sqrt{\frac{1}{2}} \times V_o$$

The effective value $V_{bias}$ of the voltage on the composition of the non-selected segments other than the above is expressed by:

$$V_{bias} = \sqrt{\frac{(V_o/2)^2 \times 2 + 0}{3}} = \sqrt{\frac{1}{6}} \times \frac{V_o}{2}$$

\* 1/M Bias ½ duty drive system

Figure 6:
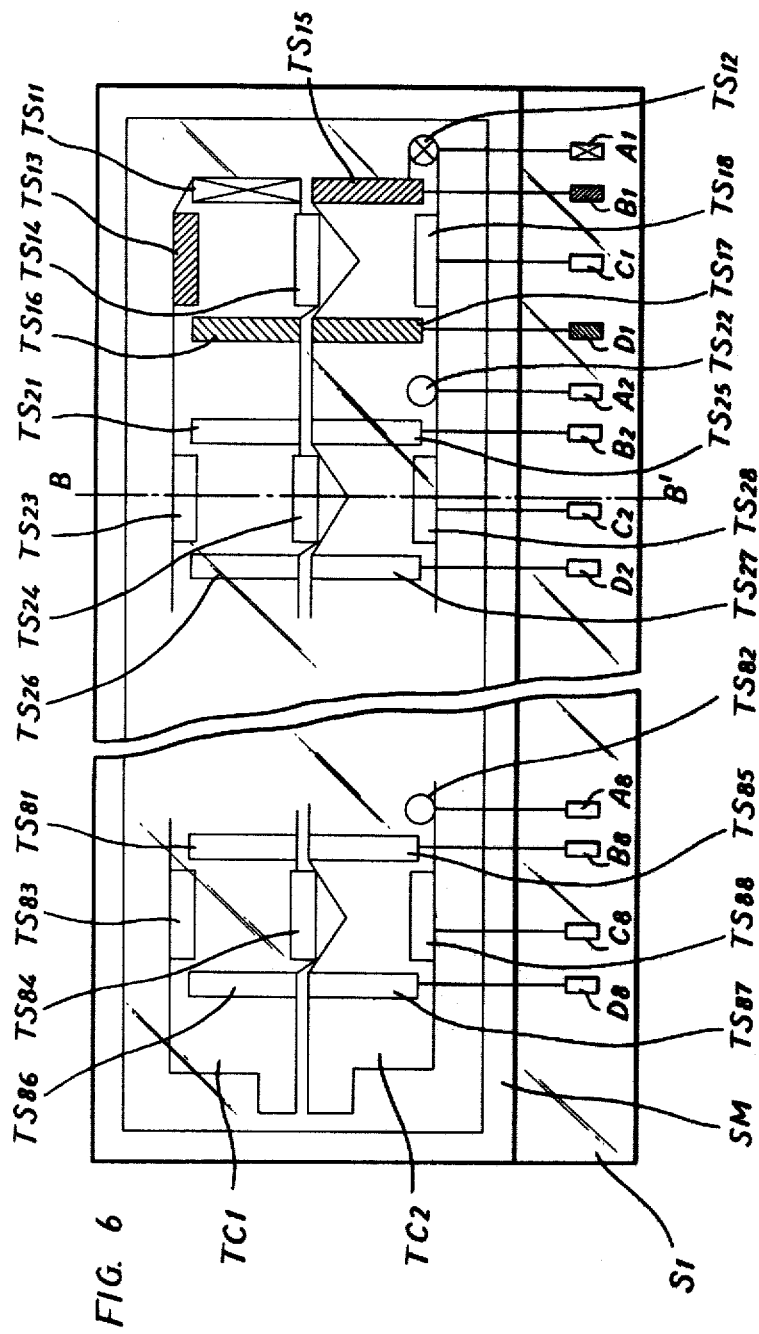
FIG. 6 is a plan view of another form of a twisted-nematic Field Effect mode liquid crystal cell in accordance with the present invention.
Figure 7:
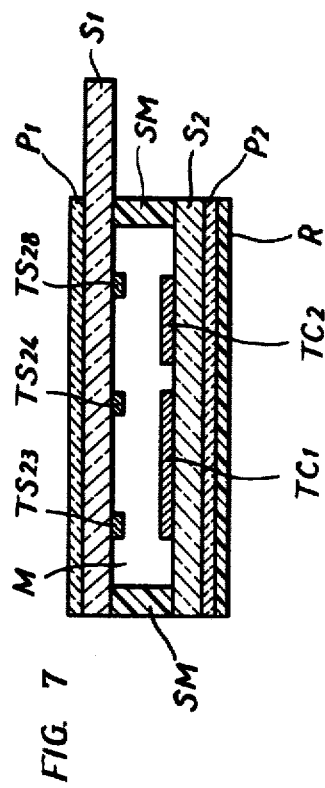
FIG. 7 is a sectional view, taken along line B–B', of the liquid crystal cell of FIG. 6.

The construction of the TNFEM liquid crystal cell for which this drive system is used will be described with reference to FIGS. 6 and 7. FIG. 6 is a plan view, and FIG. 7 is a view in section taken along the line B-B' in FIG. 6.

The difference of this cell from the cell of FIGS. 1 and 2 only will be described.

The liquid crystal cell differs from the foregoing cell in that it includes two transparent common electrodes $TC_1$, $TC_2$ and that transparent segmental electrodes are connected to the terminals led out therefrom in a different manner.

Transparent segmental electrodes $TS_{i1}$, $TS_{i2}$ are connected together and coupled to a terminal $A_i$, $TS_{i3}$ and $TS_{i5}$ are connected together and coupled to a terminal $B_i$, $TS_{i4}$ and $TS_{i8}$ are connected together and coupled to a terminal $C_i$, $TS_{i6}$ and $TS_{i7}$ are connected together and coupled to a terminal $D_i$ wherein $i = 1, \ldots, 8$.

(a) ½ Bias ⅓ duty drive system

Figure 8:
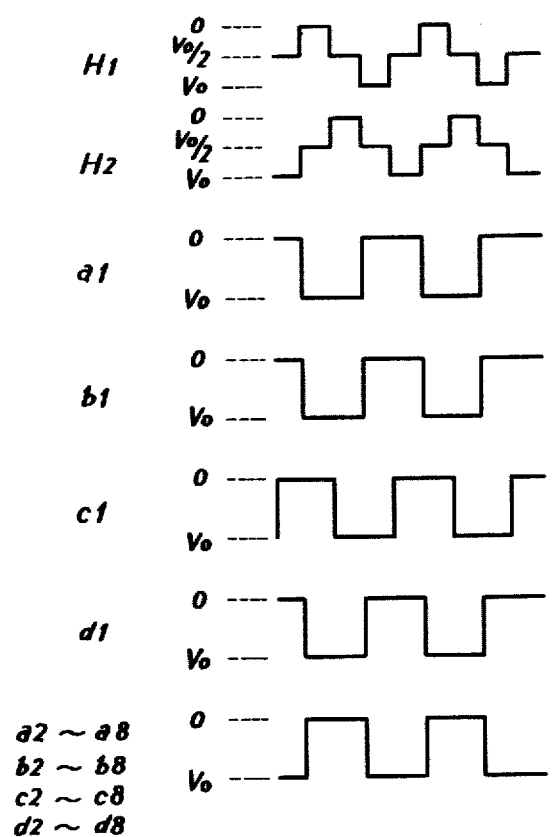
FIG. 8 is a time chart showing the wave forms of voltages applied to a ½ bias, ½ duty drive system utilized to drive the liquid crystal cell of FIG. 6.

FIG. 8 is a time chart showing the wave forms involved in this drive system, namely of the transparent common electrode selection signals $H_1$, $H_2$ to be applied to the common electrodes $TC_1$, $TC_2$ respectively, and transparent segmental electrode selection signals $a_1$, $b_1$, $c_1$, $d_1$, $a_2$, ..., $d_8$ to be applied to the terminals $A_1$, $B_1$, $C_1$, $D_1$, $A_2$, ..., $C_8$, $D_8$ respectively when ⌐⌐ is to be displayed at the lowermost place. With this ½ bias ½ duty drive system, the effective value $V_{on}$ of the voltage to be applied to the liquid crystal composition of the selected segments is given by:

$$V_{on} = \sqrt{\frac{V_o^2 + (V_o/2)^2}{2}} = \sqrt{\frac{5}{2}} \times \frac{V_o}{2}$$

The effective value $V_{bias}$ of the voltage on the liquid crystal composition of the non-selected segments is given by:

$$V_{bias} = \sqrt{\frac{0 + (V_o/2)^2}{2}} = \sqrt{\frac{1}{2}} \times \frac{V_o}{2}$$

(b) ⅓ Bias ½ duty drive system

Figure 9:
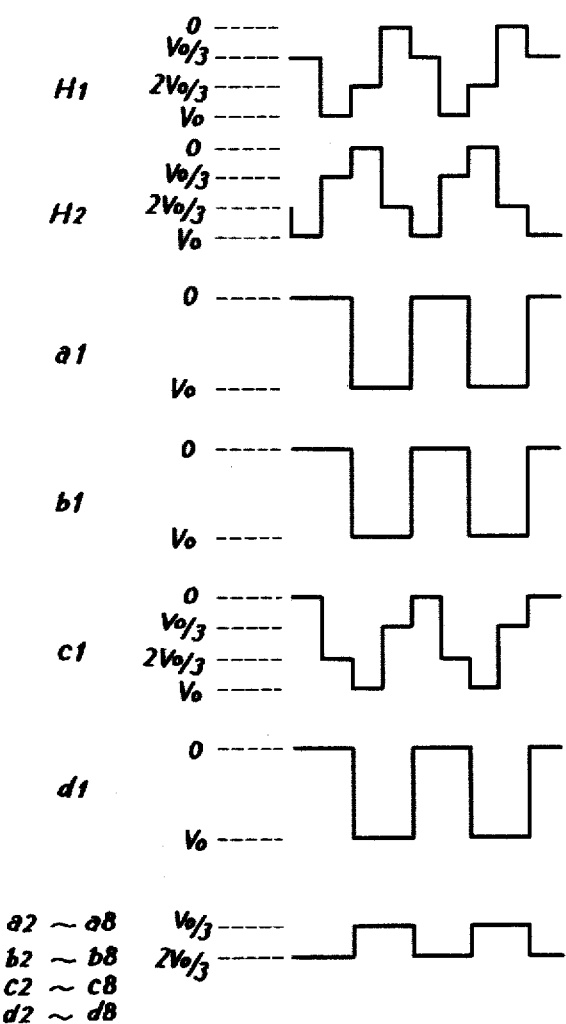
FIG. 9 is at time chart showing wave forms of voltages applied to a ⅓ bias, ½ duty drive sytem utilized to drive the liquid crystal cell of FIG. 6.

FIG. 9 is a time chart showing the wave forms involved in this drive system, namely of the transparent common electrode selection signals $H_1$, $H_2$ to be applied to the common electrode $TC_1$, $TC_2$ respectively, and transparent segmental electrode section signals $a_1$, $b_1$, $c_1$, $d_1$, $a_2$, ..., $d_8$ to be applied to the terminals $A_1$, $B_1$, $C_1$, $D_1$, $A_2$, ..., $C_8$, $D_8$ respectively when ⌐⌐ is to be displayed at the lowermost place. With this ⅓ bias ½ duty drive system, the effective value $V_{on}$ of the voltage to be applied to the liquid crystal composition of the selected segments is given by:

$$V_{on} = \sqrt{\frac{V_o^2 + (V_o/3)^2}{2}} = \sqrt{5} \times \frac{V_o}{3}$$

The effective value $V_{bias}$ of the voltage on the composition of the non-selected segments other than the above is expressed by:

$$V_{bias} = (V_o/3)$$

Definition of the threshold voltage $V_{th}$

Figure 10:
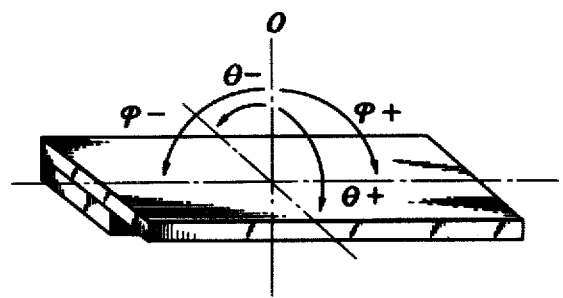
FIG. 10 is an explanatory perspective view in illustration of the angle from which measurement of the threshold voltage was made.
Figure 11:
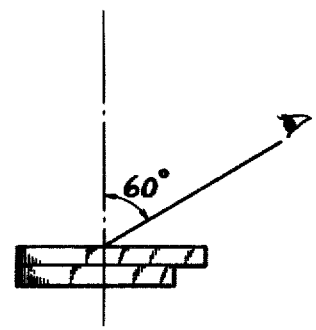
FIG. 11 is a side view of FIG. 10.

A liquid crystal composition is filled in the liquid crystal cell shown in FIGS. 1 and 2 or in FIGS. 6 and 7, and 1-KHz a.c. voltage is applied across the transparent common electrode and transparent segmental electrode of a desired segment, with the voltage value progressively increased. The threshold voltage $V_{th}$ is defined as the effective value of the applied voltage at which the segment starts to produce a display as confirmed by observation. The observation is made in the direction in which $\theta = +60°$ and $\phi = 0°$ in FIG. 10 (see FIG. 11).

(3) Response time

The response time is dependent on the cell thickness and drive system of the liquid crystal display device concerned. When these two factors are given, it is proportional to the viscosity of the liquid crystal composition. It is believed that the useful range is limited to not longer than 800 m. sec. since if the time is more than 800 m. sec., the response appears somewhat slow to the eye.

Definition of the response time

Figure 12:
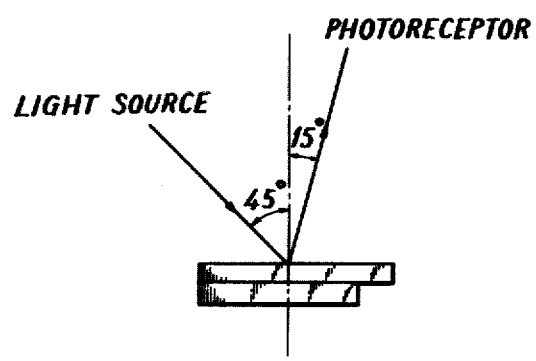
FIG. 12 is schematic view illustrating set-up for measurement of response time.

The response time is measured by filling a liquid crystal composition in the cell shown in FIGS. 1 and 2 or in FIGS. 6 and 7 and applying across the electrodes the voltage determined by the drive system concerned. The measuring system is shown in FIG. 12. The rise time $\tau_r$ is defined as the time required for the quantity of light received to reduce to 10% of the saturation value after the voltage applied to the liquid crystal composition of a desired segment has changed from $V_{bias}$ to $V_{on}$. The decay time $\tau_d$ is defined as the time required for the quantity of light received to restore to 90% of the saturation value after the voltage applied to the composition of the desired segment has changed from $V_{on}$ to $V_{bias}$.

(4) Orientation

It is desired that the base plates be highly wettable (i.e. of low surface tension). If not easily wettable, a display of reduced quality as well as reduced production yield will result. The wettability is evaluated empirically since there is no definite index presently available therefor.

(5) Reliability

The characteristics (1) to (4) and power consumption must be maintained at stable levels during storage or operation over a prolonged period of time. Thus the liquid crystal composition needs to be chemically stable against heat, water, alkalis and acids.

The liquid crystal compositions of this invention will be described below in greater detail with reference to specific examples, to which the invention is in no way limited.

EXAMPLE 1

The following liquid crystal composition was prepared.

| | |
|---|---|
| 4-n-Pentyl-4'-cyano-biphenyl | 34.6% w/w |
| 4-n-Pentoxy-4'-cyano-biphenyl | 9.9 |
| 4-n-Heptyl-4'-cyano-biphenyl | 20.9 |
| 4-n-Pentyl-4'cyano-p-terphenyl | 6.6 |
| 4'-Cyanophenyl 4-(n-butyl)benzoate | 9 |
| 4'-Cyanophenyl 4-(n-pentyl)benzoate | 9 |
| 4'-Cyanophenyl 4-(n-pentyl)thiobenzoate | 10 |

The liquid crystal composition had a mesomorphic range of 60° C. to −25° C. (free from freezing for 5 days). The expression "−25° C. (free from freezing for 5 days)" means that the composition did not freeze when allowed to stand at −25° C. for 5 days. To be more accurate, therefore, the lower limit of the mesomorphic range is lower than −25° C.

The liquid crystal composition of Example 1 was filled in the liquid crystal cell shown in FIGS. 1 and 2 or FIGS. 6 and 7, and the resulting device was evaluated. The device was found to have good orientation and satisfactory characteristics with respect to threshold voltage and response time so as to be driven by a single lithium cell.

The composition was further tested for orientation as placed in a cell prepared by rubbing and oblique deposition. (The cell included two base plates for sandwiching the composition, one of the base plates being surface-treated by rubbing and the other base plate having an oblique deposition film formed on the surface thereof.) Consequently it was found that if the cell thickness is not larger than 8 μm, the device can be statically driven by a single silver oxide cell. The results of the experiment are as follows:

$\tau_r = 900$ m. sec.
$\tau_d = 300$ m. sec.
Measuring conditions

| | |
|---|---|
| Drive system: | static |
| Power supply cell: | silver oxide cell ($V_0 = 1.57$ volts) |
| $V_{on}$: | 1.5 volts |
| Cell thickness: | 8 μm |
| Temperature: | 0° C. |

It was further visually confirmed that if the response time is not more than 1000 m. sec., the display turns on and off every second.

EXAMPLE 2

The following liquid crystal composition was prepared.

| | |
|---|---|
| 4-n-Pentyl-4'-cyano-biphenyl | 33.6% w/w |
| 4-n-Pentoxy-4'-cyano-biphenyl | 9.8 |
| 4-n-Heptyl-4'-cyano-biphenyl | 20.3 |
| 4'-Cyanophenyl 4-(p-n-pentylphenyl)benzoate | 6.3 |
| 4'-Cyanophenyl 4-(n-butyl)benzoate | 10 |
| 4'-Cyanophenyl 4-(n-pentyl)benzoate | 10 |
| 4'-Cyanophenyl 4-(n-pentyl)thiobenzoate | 10 |

The liquid crystal composition had a mesomorphic range of 58.2° C. to −25° C. (free from freezing for 5 days) and good orientation and was suitable in threshold voltage and response time so as to be driven by a single power cell.

EXAMPLE 3

The following liquid crystal composition was prepared.

| | |
|---|---|
| 4-n-Pentyl-4'-cyano-biphenyl | 30% w/w |
| 4-n-Pentoxy-4'-cyano-biphenyl | 8 |
| 4-n-Pentyl-4'-cyano-p-terphenyl | 8 |
| 4-Heptyl-4'-cyano-biphenyl | 10 |
| 4'-Cyanophenyl 4-(n-butyl)benzoate | 12 |
| 4'-Cyanophenyl 4-(n-pentyl)benzoate | 17 |
| 4'-Cyanophenyl 4-(n-heptyl)benzoate | 10 |
| 4'-Cyanophenyl 4-(n-propylcarbonyloxy)benzoate | 5 |

The liquid crystal composition had a mesomorphic range of 60.5° C. to −25° C. (free from freezing for 5 days) and good orientation and was suitable in threshold voltage and response time so as to be driven by a single power cell.

EXAMPLE 4

The following liquid crystal composition was prepared.

| | |
|---|---|
| 4-n-Pentyl-4'-cyano-biphenyl | 33.6% w/w |
| 4-n-Pentoxy-4'-cyano-biphenyl | 9.8 |
| 4'-Cyanophenyl 4-(n-pentylphenyl)benzoate | 6.3 |
| 4-n-Pentylcyclohexyl 4'-cyanobenzene | 20.3 |
| 4'-Cyanophenyl 4-(n-butyl)benzoate | 10 |
| 4'-Cyanophenyl 4-(n-pentyl)benzoate | 10 |
| 4'-Cyanophenyl 4-(n-pentyl)thiobenzoate | 10 |

The liquid crystal composition had a mesomorphic range of 60.8° C. to −25° C. (free from freezing for 5 days) and was found to be fully satisfactory in orientation despite the use of the cyclohexyl benzene-type liquid crystal substance. The composition was suitable in threshold voltage and response time so as to be dynamically driven by a single lithium cell.

EXAMPLE 5

The following liquid crystal composition was prepared.

| | |
|---|---|
| 4-n-Pentyl-4'-cyano-biphenyl | 28.8% w/w |
| 4-n-Pentoxy-4'-cyano-biphenyl | 8.4 |
| 4'-Cyanophenyl 4-(p-n-pentylphenyl)benzoate | 5.4 |
| 4-n-Propylcyclohexyl 4'-cyanobenzene | 17.4 |
| 4'-Cyanophenyl 4-(n-butyl)benzoate | 10 |
| 4'-Cyanophenyl 4-(n-pentyl)benzoate | 10 |
| 4'-Cyanophenyl 4-(n-hexyl)benzoate | 10 |
| 4'-Cyanophenyl 4-(n-pentyl)thiobenzoate | 10 |

The liquid crystal composition had a mesomorphic range of 60.5° C. to −25° C. (free from freezing for 5 days) and good orientation. The composition was also found suitable in both threshold voltage and response time for dynamic drive with use of a single lithium cell.

EXAMPLES 6 TO 8

The following liquid crystal compositions were prepared.

EXAMPLE 6

| | |
|---|---|
| 4-n-Pentyl-4'-cyano-biphenyl | 30% w/w |
| 4-n-Pentoxy-4'-cyano-biphenyl | 8 |
| 4-n-Pentyl-4'-cyano-p-terphenyl | 8 |
| 4'-Cyanophenyl 4-(n-butyl)benzoate | 12 |
| 4'-Cyanophenyl 4-(n-pentyl)benzoate | 17 |
| 4'-Cyanophenyl 4-(n-heptyl)benzoate | 10 |
| 4'-Cyanophenyl 4-(n-propylcarbonyloxy)benzoate | 5% w/w |
| 4-n-Pentylcyclohexyl 4'-cyanobenzene | 10 |

EXAMPLE 7

| | |
|---|---|
| 4-n-Pentyl-4'-cyano-biphenyl | 30% w/w |
| 4-n-Pentoxy-4'-cyano-biphenyl | 8 |
| 4-n-Pentyl-4'-cyano-p-terphenyl | 8 |
| 4-n-Heptyl-4'-cyano-biphenyl | 10 |
| 4'-Cyanophenyl 4-(n-butyl)benzoate | 12 |
| 4'-Cyanophenyl 4-(n-pentyl)benzoate | 17 |
| 4'-Cyanophenyl 4-(n-propylcarbonyloxy)benzoate | 5 |

| | |
|---|---|
| -continued | |
| 4-n-Pentylcyclohexyl 4'-cyanobenzene | 10 |

EXAMPLE 8

| | |
|---|---|
| 4-n-Pentyl-4'-cyano-biphenyl | 29.9% w/w |
| 4-n-Pentoxy-4'-cyano-biphenyl | 8 |
| 4-n-Pentyl-4'-cyano-p-terphenyl | 8 |
| 4'-Cyanophenyl 4-n-(butyl)benzoate | 12 |
| 4'-Cyanophenyl 4-(n-pentyl)benzoate | 17 |
| 4'-Cyanophenyl 4-(n-propylcarbonyloxy)benzoate | 5 |
| 4-n-Butylcyclohexyl 4'-cyanobenzene | 6.7 |
| 4-n-Pentylcyclohexyl 4'-cyanobenzene | 6.7 |
| 4-n-Heptylcyclohexyl 4'-cyanobenzene | 6.7 |

The liquid crystal compositions of Examples 6 to 8 had mesomorphic ranges of 61.1° C. to −25° C., 59.3° C. to −25° C. and 59.7° C. to −25° C. respectively in the order mentioned and were free of freezing at −25° C. for 5 days. They had good orientation and were found suitable in both threshold voltage and response time for dynamic drive with use of a single lithium cell.

Table 2 below shows characteristics (threshold voltage and response time) of the liquid crystal compositions of this invention in comparison with those of various like compositions heretofore known.

TABLE 2

| Comp. No. | $V_{th}$ (volts) | | $\tau$(⅓ Bias ½ duty) (m. sec.) | | $\tau$(½ Bias ⅓) | |
|---|---|---|---|---|---|---|
| | 25° C. | 0° C. | $\tau_r$(0° C.) | $\tau_d$(0° C.) | $\tau_r$(0° C.) | $\tau_d$(0° C.) |
| 1 | 0.94 | 1.12 | 600 | 210 | 1250 | 210 |
| 2 | 0.86 | 1.02 | 350 | 250 | 800 | 250 |
| 3 | 0.93 | 1.06 | — | — | 800 | 210 |
| 4 | 0.86 | 1.00 | 340 | 220 | 750 | 220 |
| 5 | 0.88 | 1.06 | 330 | 260 | 690 | 260 |
| 6 | 0.92 | 1.07 | — | — | 920 | 200 |
| 7 | 0.94 | 1.07 | — | — | 760 | 190 |
| 8 | 0.92 | 1.09 | — | — | 800 | 170 |
| 9 | 1.16 | 1.33 | 580 | 330 | 980 | 330 |
| 10 | 1.11 | 1.33 | 420 | 310 | 990 | 310 |
| 11 | 1.12 | 1.24 | 600 | 600 | 1600 | 600 |
| 12 | 1.0 | 1.19 | 580 | 470 | 920 | 470 |
| 13 | 0.91 | 1.05 | 450 | 380 | 800 | 380 |
| 14 | 0.93 | 1.04 | 450 | 240 | 1000 | 240 |

In Table 2 above
1: Example 1 of this invention
2: Example 2 of this invention
3: Example 3 of this invention
4: Example 4 of this invention
5: Example 5 of this invention
6: Example 6 of this invention
7: Example 7 of this invention
8: Example 8 of this invention
9: E-7 (product of Merck & Co., Inc.)
10: E-8 (product of Merck & Co., Inc.)
11: E-9 (product of Merck & Co., Inc.)
12: ROCE 200 (product of Hoffmann-LaRoche Inc.)
13: TN 132 (product of Hoffmann-LaRoche Inc.)
14: TN 430 (product of Hoffmann-LaRoche Inc.)
$V_{th}$: threshold voltage
$\tau$: response time
$\tau_r$: rise time
$\tau_d$: decay time
Measuring conditions
Liquid crystal cell used: one shown in FIGS. 1 and 2 or in FIGS. 6 and 7 (7.5 μm in cell thickness)
Drive system: ⅓ bias ½ duty drive or ½ bias ⅓ duty drive
$V_{on}$: 2.21 volts (⅓ bias ½ duty drive system) 1.78 volts (½ bias ⅓ duty drive system)
$V_{bias}$: 0.98 volt (⅓ bias ½ duty drive system) 0.93 volt (½ bias ⅓ duty drive system)
Power supply cell: lithium cell

I claim:

1. A liquid crystal composition having a wide mesophase range encompassing room temperature, low threshold voltage, quick response time and satisfactory orientation suitable for use in display devices employing a compact power cell comprising at least one compound represented by the formula (I):

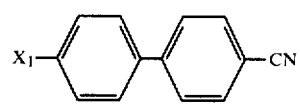

wherein $X_1$ is n-alkyl having 4 to 8 carbon atoms, n-alkoxy having 4 to 8 carbon atoms or p-n-alkyl-phenyl containing $C_{4-8}$ n-alkyl, and at least one compound represented by the formula (II):

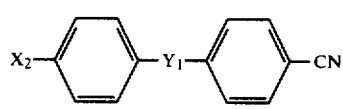

wherein $X_2$ is n-alkyl having 4 to 8 carbon atoms, n-alkylcarbonyloxy having 4 to 9 carbon atoms or p-n-alkylphenyl containing $C_{4-8}$ n-alkyl, and $Y_1$ is a group represented by —COO— or —COS—, and further at least one compound represented by the formula (III):

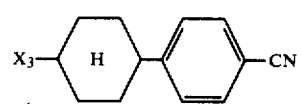

wherein $X_3$ is n-alkyl having 3 to 8 carbon atoms.

2. A liquid crystal composition as claimed in claim 1, wherein $X_1$ in the formula (I) is pentyl, heptyl, pentoxy or pentylphenyl.

3. A liquid crystal composition as claimed in claim 1, wherein $X_2$ in the formula (II) is butyl, pentyl, hexyl, heptyl, propylcarbonyloxy or pentylphenyl and $Y_1$ is —COO—.

4. A liquid crystal composition as claimed in claim 1, wherein $X_3$ is propyl, pentyl or heptyl.

5. A liquid crystal composition as claimed in claim 1, comprising 4-n-pentyl-4'-cyano-biphenyl, 4-n-pentoxy-4'-cyano-biphenyl, 4'-cyanophenyl 4-(n-pentylphenyl) benzoate, 4-n-pentylcyclohexyl 4'-cyanobenzene, 4'-cyanophenyl 4-(n-butyl)benzoate, 4'-cyanophenyl 4-(n-pentyl)benzoate and 4'-cyanophenyl 4-(n-pentyl)thiobenzoate.

6. A liquid crystal composition as claimed in claim 1, comprising 4-n-pentyl-4'-cyano-biphenyl, 4-n-pentoxy-4'-cyano-biphenyl, 4'-cyanophenyl 4-(p-n-pentylphenyl) benzoate, 4-n-propylcyclohexyl 4'-cyanobenzene, 4'-cyanophenyl 4-(n-butyl)benzoate, 4'-cyanophenyl 4-(n-pentyl)benzoate, 4'-cyanophenyl 4-(n-hexyl)benzoate and 4'-cyanophenyl 4-(n-pentyl)thiobenzoate.

7. A liquid crystal composition as claimed in claim 1, comprising 4-n-pentyl-4'-cyano-biphenyl, 4-n-pentoxy-4'-cyano-biphenyl, 4-n-pentyl-4'-cyano-p-terphenyl, 4'-cyanophenyl 4-(n-butyl)benzoate, 4'-cyanophenyl 4-(n-pentyl)benzoate, 4'-cyanophenyl 4-(n-heptyl)benzoate, 4'-cyanophenyl 4-(n-propylcarbonyloxy)benzoate and 4-n-pentylcyclohexyl 4'-cyanobenzene.

8. A liquid crystal composition as claimed in claim 1, comprising 4-n-pentyl-4'-cyano-biphenyl, 4-n-pentoxy-4'-cyano-biphenyl, 4-n-pentyl-4'-cyano-p-terphenyl, 4-n-heptyl-4'-cyano-biphenyl, 4'-cyanophenyl 4-(n-butyl) benzoate, 4'-cyanophenyl 4-(n-pentyl)benzoate, 4'-cyanophenyl 4-(n-proplycarbonyloxy)benzoate and 4-n-pentylcyclohexyl 4'-cyanobenzene.

9. A liquid crystal composition as claimed in claim 1, comprising 4-n-pentyl-4'-cyano-biphenyl, 4-n-pentoxy-4'-cyano-biphenyl, 4-n-pentyl-4'-cyano-p-terphenyl, 4'-cyanophenyl 4-(n-butyl)benzoate, 4'-cyanophenyl 4-(n-pentyl)benzoate, 4'-cyanophenyl 4-(n-propylcarbonyloxy)benzoate, 4-n-butylcyclohexyl 4'-cyanobenzene, 4-n-pentylcyclohexyl 4'-cyanobenzene and 4-n-heptylcyclohexyl 4'-cyanobenzene.

10. A liquid crystal composition as claimed in claim 1, wherein at said at least one compound of the formula (I) is present in an amount of from about 37.2% to about 56% w/w, said at least one compound of the formula (II) is present in an amount of from about 34% to about 45.4 w/w, and said at least one compound of formula (III) is present in an amount of from about 10% to about 20.3 w/w.

11. A liquid crystal composition having a mesophase range of at least from about $-10°$ C. to about $50°$ C., a response time of not longer than 920 m. sec., a threshold voltage of from about 0.86 to 0.94 volts at $25°$ C., and satisfactory orientation comprising at least one compound represented by the formula (I):

wherein $X_1$ is n-alkyl having 4 to 8 carbon atoms, n-alkoxy having 4 to 8 carbon atoms or p-n-alkyl-phenyl containing $C_{4-8}$ n-alkyl, and at least one compound represented by the formula (II):

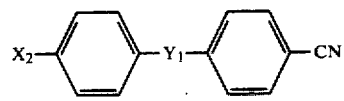

wherein $X_2$ is n-alkyl having 4 to 8 carbon atoms, n-alkylcarbonyloxy having 4 to 9 carbon atoms or p-n-alkylphenyl containing $C_{4-8}$ n-alkyl, and $Y_1$ is a group represented by —COO— or —COS—, and further at least one compound represented by the formula (III):

wherein $X_3$ is n-alkyl having 3 to 8 carbon atoms.

* * * * *